United States Patent Office 2,928,418
Patented Mar. 15, 1960

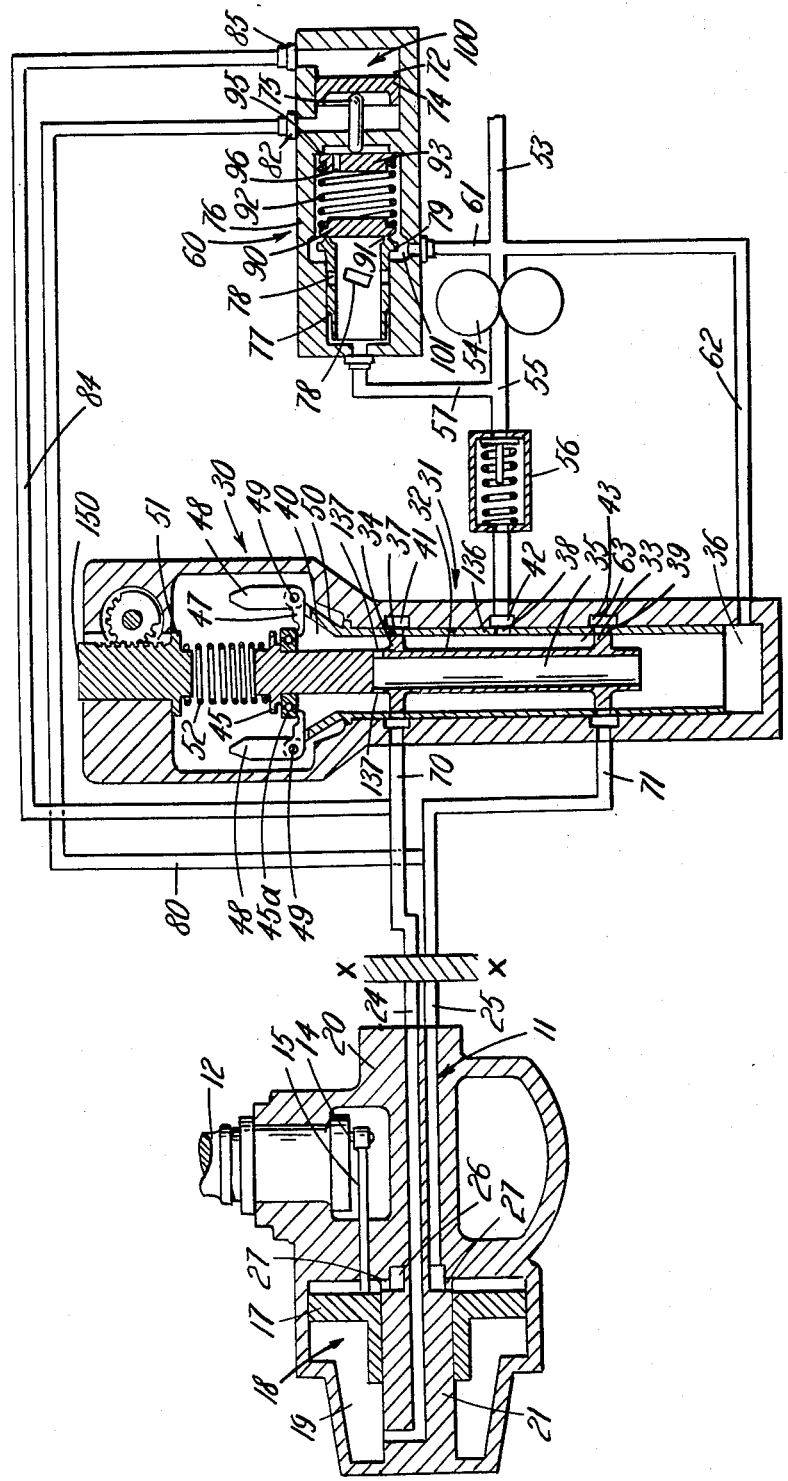

2,928,418

RELIEF VALVES FOR FLUID PUMPS

Richard James Wall, Gloucester, England, assignor to Rotol Limited, Gloucester, England, a British company Application October 29, 1956, Serial No. 618,933

Claims priority, application Great Britain November 9, 1955

8 Claims. (Cl. 137—540)

This invention relates to relief valves for fluid pumps and concerns a relief valve for a fluid pump which pump is required to deliver, through a valve means, pressure fluid to alternative points of usage, the valve means being operable to supply either point of usage with pressure fluid delivered by the pump, and at the same time to relieve the pressure of fluid at the other point of usage. The object of the invention is to provide a novel construction of relief valve which will enable a higher maximum pump delivery pressure to be obtained when the pump is delivering to one of the points of usage (hereinafter called the "higher pressure point") than when it is delivering to the other point of usage (hereinafter called the "lower pressure point").

The invention is applied to relief valves of the kind comprising a valve structure having a connection through which the relief valve may be supplied with the pressure to be relieved and a valve element movable in said structure against the action of resilient means by pressure supplied to the relief valve through said connection to relieve said pressure. According to the invention such a valve is characterised by a pressure fluid operated motor operable to adjust the load in said resilient means, and a second connection through which the motor may be supplied with pressure to operate the motor, the arrangement being such that the load in said resilient means is adjusted by the motor in accordance with the pressure supplied to the motor through said second connection and is increased when the pressure so supplied to the motor is increased.

As is well understood a relief valve for a fluid pump acts to limit the pump delivery pressure to a predetermined maximum, according to the setting of the relief valve. When the pump delivery pressure reaches the pressure determined by the setting of the valve the valve opens to place the delivery side of the pump in communication with a lower pressure zone thereby to relieve the pump delivery pressure. In a pneumatic system for example, the lower pressure zone might be the atmosphere. Where the pump is a liquid pump however conduit means is usually provided through which the delivery side of the pump is communicated with a suitable drain when the relief valve opens. The drain may conveniently be the suction side of the liquid pump with which the relief valve is associated. In use, the first said connection of a relief valve as defined in the next but one preceding paragraph is connected to the delivery side of the pump and the second connection of the relief valve is connected to the higher pressure point so that when the higher pressure point is supplied with pressure fluid from the pump, said motor is operated to increase the loading in said resilient means, and when the lower pressure point is supplied with pressure fluid from the pump said motor is rendered ineffective to maintain the increased loading in said resilient means. In the case where the pump is a liquid pump conduit means would be provided connecting the relief valve to a suitable drain, the arrangement being such that when the relief valve opens the delivery side of the pump is communicated through said first said connection and said conduit means with the drain.

Preferably said motor is a double acting motor operable on one side to increase the load in said resilient means and on the other side to decrease the load in said resilient means, and the relief valve comprises a third connection through which said other side of the motor may be supplied with pressure. In use, when these preferred features are adopted, the third connection is connected with the lower pressure point so that whichever pressure point is supplied with pressure fluid from the pump, said motor is operated by the pump to increase the loading in said resilient means when the higher pressure point is supplied, and to decrease the loading in said resilient means when the lower pressure point is supplied.

A relief valve according to the present invention finds particular application as the relief valve for the fluid pump of a constant speed governor unit of a hydraulic variable pitch propeller having a double acting hydraulic pitch change motor.

Due to the tendency of the propeller blades of a variable pitch propeller to move towards fine pitch under the aerodynamic and centrifugal forces acting upon them during rotation of the propeller, a higher hydraulic pressure is required in the pitch change motor of the propeller to move the blades towards coarse pitch than towards fine pitch. In these circumstances it is desirable that the relief valve of the pump of a constant speed governor unit controlling the propeller have a setting which is higher when the pump is delivering coarse pitch pressure fluid than when the pump is delivering fine pitch pressure fluid, that is to say, pressure fluids moving the propeller blades towards coarse pitch and fine pitch respectively.

An hydraulic system of an hydraulic variable pitch propeller the system including a relief valve according to the invention, will now be described in greater detail merely by way of example, and with reference to the accompanying drawing which shows the system in diagrammatic form.

Referring to the drawing the system comprises a propeller having a hub 11 upon which are journalled four propeller blades, the root portion of one of which is shown at 12, so that the blades are rotatable about their longitudinal pitch change axes. Each blade root has secured to it a crank pin 14 which is coupled by a connecting rod 15 to a ram 17 of a double acting hydraulic pitch change motor generally indicated at 18, the ram being slidable in a cylinder 19 secured to the forward end of the hub 11 coaxially with the propeller driving shaft 20.

The ram 17 is of annular form and is slidable upon a stationary barrel 21 supported within the cylinder 19.

A channel 24 passes through the driving shaft 20 and through the barrel 21 and opens to the cylinder 19 on the forward side of the ram 17. The channel 24 is used to convey coarse pitch pressure fluid to the pitch change motor 18 to move the propeller blades in the pitch coarsening direction.

A further channel 25 passes through the propeller driving shaft 20 and this channel communicates with an annular space 26 which in turn communicates through ports 27 with the cylinder 19 on the rearward side of the ram 17. The channel 25 is used to convey fine pitch pressure fluid to the pitch change motor 18 to move the propeller blades in the pitch fining direction.

The constant speed unit of the hydraulic system of the propeller is generally indicated at 30. The constant speed unit comprises a circular cross-sectioned casing generally indicated at 31 which, in its lower part, houses a valve 32 which valve is provided with lands 33 and 34 and a central bore 35 which leads from a chamber 36 below the valve 32 through ports 137 to a space 40 in the upper part of the casing 31.

Between the valve 32 and the lower part of the casing 31 is a rotatable sleeve 136 having three sets of radial ports 37, 38 and 39, these ports registering respectively with annular chambers 41, 42 and 43 in the casing 31. In the equilibrium position of the valve 32 the ports 37 also register with the land 34 of the valve and the ports 39 register with the land 33 of the valve.

The valve 32 extends upwardly into the upper part of the casing 31 and is provided with a head 45 against the underside of which bear the inner ends 47 of flyweights 48 through the intermediary of a ball bearing 45a. The flyweights are pivotally mounted as at 49 on extensions 50 of the sleeve 136. The sleeve 136 and the flyweights 48 are together rotatable about the axis of the valve 32 in well known manner by a drive from the engine driving the propeller.

Slidably mounted within the upper part of the casing 31 is a member 150 having a flange 51 at its lower end, and interposed between the flange 51 and the head 45 of the valve 32 is a coil spring 52 the loading in which is adjustable by movement of the member 150 in well known manner to adjust the datum setting of the constant speed governor unit.

A conduit 53 supplying oil under pressure from the engine driving the propeller leads to the suction side of a constant speed unit pump 54 which is driven from the engine with the sleeve 136 and the flyweights 48 to deliver fluid under pressure through a conduit 55 containing a non-return valve 56 to the annular chamber 42 in the casing 31. A branch conduit 57 is taken from the conduit 55 between the non-return valve 56 and the pump 54 to a pressure relief valve generally indicated at 60 and thence back to the conduit 53 through a conduit 61. The relief valve 60 is a relief valve in accordance with the present invention and is hereinafter described in detail. A further conduit 62 is provided leading from the chamber 36 in the casing 31 to the conduit 53.

Fluid under pressure delivered by the pump 54 passes from the annular chamber 42 through the ports 38 into annular space 63 between the lands 33 and 34 of the valve 32.

The constant speed unit acts in well known manner to maintain, for each particular setting of the member 150, a constant speed of rotation of the propeller, the flyweights 48 acting to lift the valve member 32 when the propeller overspeeds to communicate the annular space 63 through ports 37 with the annular chamber 41 and thence through a coarse pitch pressure conduit 70 through suitable transfer means, denoted XX, to the conduit 24 and thence to the coarse pitch side of the pitch change motor 18 to move the blades towards coarse pitch and thereby reduce the speed of rotation of the propeller. Conversely, when the propeller underspeeds the flyweights 48 move inwardly thus allowing the valve 32 to be lowered under the action of the spring 52 to place the annular space 63 in communication with a fine pitch pressure conduit 71 through ports 39 and annular chamber 43, the conduit 71 leading through the transfer means XX to the conduit 25 and thence to the fine pitch side of the pitch change motor 18 to move the blades towards fine pitch and thereby increase the speed of rotation of the propeller. In either circumstance movement of the valve 32 from its eqilibrium position, in which it is shown in the drawing, places one conduit 70 or 71 in communication with the delivery side of the pump 54 and the other conduit 71 or 70 in communication with the space below the land 33 or the space above the land 34 which spaces are in communication with the fluid supply conduit 53 on the suction side of the pump 54, the fluid pressure on one side of the pitch change motor thus being relieved each time fluid is supplied under pressure to the other side of the pitch change motor.

As previously mentioned a higher hydraulic pressure is required to move the ram 17 in the pitch coarsening direction than in the pitch fining direction and in these circumstances it is required that the relief valve 60 have a higher setting when the pump 54 is delivering coarse pitch pressure fluid to the conduit 70 than when the pump is delivering fine pitch pressure fluid to the conduit 71.

The relief valve 60 comprises a double acting hydraulic motor generally indicated at 100 having a cylinder 72 and a piston 74. A rod member 75 extends from the piston 74 through an end wall of the cylinder 72 and projects into the valve structure or casing 76 of the relief valve 60, the casing 76 being coaxial with the cylinder 72.

A conduit 80 leads from the conduit 71 to a connection 82 on the hydraulic motor 100, the connection 82 communicating with the cylinder 72 on the left hand side of the piston 74 in the drawing. A further conduit 84 connects the conduit 70 with a connection 85 on the hydraulic motor 100 and the connection 85 communicates with the cylinder 72 on the right hand side of the piston 74 in the drawing.

The relief valve 60 proper comprises a tubular valve member 77 having radial ports 78 about midway along its length and a shoulder 79 towards its end adjacent the motor 100. The ports 78 are each rectangular in shape and are arranged with all their sides inclined to the axis of the tubular member 77 for the purpose hereinafter explained. A disc member 90 is urged against a seating 91 at the right hand extremity of the tubular member 77 by a coil spring 92. The coil spring 92 is seated between the disc member 90 and an abutment which takes the form of a further disc member 93 which in turn seats against a stop 95 at the right hand end of the casing 76. The tubular member 77 is a sliding fit in the left hand end of the bore of the casing 76 and extends into a larger diameter part of the bore in which are housed the disc members 90 and 93 and the coil spring 92, there being a substantial clearance between this part of the casing and the disc like members and the coil spring.

An aperture 96 is provided in the disc member 93, and the rod member 75 bears against this disc member on its side remote from the coil spring 92.

The conduit 57 opens into the left hand end of the bore of the casing 76 through a suitable connection and communicates with the interior of the tubular member 77, while the conduit 61 communicates with the larger diameter part of the bore containing the disc members and the coil spring through a suitable drain connection.

In operation, when the valve 32 of the constant speed unit is moved such that coarse pitch fluid under pressure is delivered into the conduit 70 and thence to the coarse pitch side of the pitch change motor, so that the conduit 71 is placed in communication with the suction side of the pump 54 and the pressure in the fine pitch side of the pitch change motor is relieved, the coarse pitch pressure is communicated through the conduit 84 with the cylinder 72 on the right hand side of the piston 74 while the cylinder 72 on the left hand side of the piston 74 is placed in communication with the suction side of the pump 54 via the conduit 80, the annular chamber 43, chamber 36 and the conduit 62. The piston 74 is thus displaced to the left in the drawing and consequently the disc member 93 is urged by the rod member 75 off its stop 95 to compress the coil spring 92 and thereby increase the loading in this spring.

Conversely when the valve 32 of the constant speed unit is moved such that fine pitch pressure fluid is delivered from the pump 54 to the conduit 71 and thence to the fine pitch side of the pitch change motor so that the conduit 70 is placed in communication with the suction side of the pump 54 and the pressure in the coarse pitch side of the pitch change motor is relieved, the fine pitch pressure is communicated through the conduit 80 to the cylinder 72 on the left hand side of the piston 74 while the cylinder 72 on the right hand side of the piston 74 is placed in communication with the suction side of the pump 54 through the conduit 84, the conduit 70, the annular chamber 41, ports 37, space 40, ports 137, bore 35, chamber 36 and conduit 62 so that the piston 74 moves to the right to unload the spring 92 by allowing the coil spring to return the disc member 93 on to its stop 95.

Fluid at the delivery pressure of the pump 54 acts in the left hand end of the casing 76 upon the tubular member 77 to displace the tubular member to the right against the action of the coil spring 92, and if the delivery pressure rises above the pressure setting of the coil spring 92 the ports 78 in the tubular member 77 open to the space 101 in the casing 76 and pressure fluid delivered by the pump passes through the conduit 57 ports 78 space 101 and conduit 61 to the suction side of the pump.

Owing to the shape and disposition of the ports 78 movement of the tubular member 77 to the right first uncovers one corner of each port to the space 101. The ports 78 are therefore not cracked open suddenly but are uncovered smoothly with displacement of the tubular member.

The disc member 90 provides an emergency valve which opens should the tubular member 77 become jammed in the smaller diameter part of the bore of the casing 76, pressure fluid then passing from within the tubular member between the tubular member and the disc member 90 into the larger diameter part of the bore and thence through the drain connection and the conduit 61 to the suction side of the pump.

The coil spring 92 is designed so that when the disc member 93 is on its stop 95 the relief valve is set to open at a predetermined pressure which is the maximum pressure required to operate the pitch change motor in a sense to move the propeller blades in the pitch fining direction, while the range of movement of the piston 74 is designed to load the coil spring 92 sufficiently to increase the setting of the relief valve so that the relief valve opens only at the higher maximum pressure required to move the pitch change motor in the sense to move the propeller blades in the pitch coarsening direction.

I claim:

1. A fluid pump relief valve assemblage comprising a valve housing having a connection through which the relief valve may be supplied with the pressure to be relieved, a valve element movable in said valve housing, by pressure supplied to the relief valve through said connection, to relieve said pressure, resilient means in said valve housing and engaging said valve element, said resilient means resisting movement of said valve element to relieve pressure supplied to the relief valve through said connection, a fluid motor connected to adjust the loading in said resilient means, said motor being operable to increase the loading in said resilient means and a connection on said motor through which the motor may be supplied with pressure to operate the motor whereby the load in said resilient means is increased in accordance with the pressure supplied to the motor through said motor connection.

2. A relief valve assemblage as claimed in claim 1, wherein said motor is a double acting motor operable on one side to increase the load in said resilient means and on the other side to decrease the load in said resilient means, and the assemblage comprises a second connection on said motor through which said other side of the motor may be supplied with pressure.

3. A relief valve assemblage as claimed in claim 2, wherein said valve element comprises a tubular valve member slidable in a bore in said valve housing, and a disc member held in abutting relationship with said tubular valve member by said resilient means so as normally to close one end of said tubular valve member, said first said connection communicating with the interior of said tubular member.

4. A relief valve assemblage as claimed in claim 3, wherein said bore is provided with a small diameter part and a larger diameter part and has its larger diameter part surrounding said one end of said tubular valve member and said disc member, and there is a drain connection opening into said larger diameter part of said bore.

5. A relief valve assemblage as claimed in claim 4, wherein said tubular valve member has at least one valve port which communicates the interior of said valve member with said larger diameter part of said bore when said valve member is slidably displaced in said bore against the action of said resilient means thereby to place the interior of said tubular member in communication with said drain connection.

6. A relief valve assemblage as claimed in claim 5, wherein said valve port is rectangular in shape and has all its sides inclined to the axis of the tubular valve member.

7. A relief valve assemblage as claimed in claim 4, wherein said resilient means comprises an open coiled spring, and said spring is housed in said larger diameter bore part and is engaged between said disc member and an abutment movable by said fluid motor.

8. A relief valve assemblage as claimed in claim 7, wherein said movable abutment is held by said spring against a stop on said valve housing, and is displaceable off said stop by said fluid motor.

References Cited in the file of this patent
UNITED STATES PATENTS

| | | |
|---|---|---|
| 2,550,529 | Carson et al. | Apr. 24, 1951 |
| 2,619,979 | Le Clair | Dec. 2, 1952 |
| 2,626,670 | Moore | Jan. 27, 1953 |
| 2,655,930 | Towler | Oct. 20, 1953 |
| 2,737,253 | Moore | Mar. 6, 1956 |